US 11,982,197 B2

(12) United States Patent
Perdrigeon et al.

(10) Patent No.: US 11,982,197 B2
(45) Date of Patent: May 14, 2024

(54) DEVICE FOR DISTRIBUTING OIL FROM A ROLLING BEARING FOR AN AIRCRAFT TURBINE ENGINE

(71) Applicant: SAFRAN AIRCRAFT ENGINES, Paris (FR)

(72) Inventors: Christophe Marcel Lucien Perdrigeon, Moissy-Cramayel (FR); Didier Gabriel Bertrand Desombre, Moissy-Cramayel (FR); Regis Eugene Henri Servant, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/907,623

(22) PCT Filed: Mar. 22, 2021

(86) PCT No.: PCT/FR2021/050464
§ 371 (c)(1),
(2) Date: Sep. 28, 2022

(87) PCT Pub. No.: WO2021/198583
PCT Pub. Date: Oct. 7, 2021

(65) Prior Publication Data
US 2023/0139285 A1 May 4, 2023

(30) Foreign Application Priority Data
Apr. 2, 2020 (FR) ........................ 2003288

(51) Int. Cl.
F01D 25/16 (2006.01)
F01D 25/12 (2006.01)
(Continued)

(52) U.S. Cl.
CPC ........... *F01D 25/125* (2013.01); *F01D 25/16* (2013.01); *F01D 25/18* (2013.01); *F02C 7/06* (2013.01);
(Continued)

(58) Field of Classification Search
CPC ...... F01D 25/125; F01D 25/16; F01D 25/162; F01D 25/18; F05D 2240/54;
(Continued)

(56) References Cited

U.S. PATENT DOCUMENTS 7,870,744 B2 * 1/2011 Galivel ................. F02C 7/32
60/802
8,152,438 B2 * 4/2012 Servant ................. F16D 1/06
403/243
(Continued)

FOREIGN PATENT DOCUMENTS

FR 2949138 A1 2/2011
FR 3035154 A1 10/2016
(Continued)

OTHER PUBLICATIONS

International Search Report received for PCT Patent Application No. PCT/FR2021/050464, dated May 14, 2021, 5 pages (2 pages of English Translation and 3 pages of Original Document).

*Primary Examiner* — David E Sosnowski
*Assistant Examiner* — Jason G Davis
(74) *Attorney, Agent, or Firm* — WOMBLE BOND DICKINSON (US) LLP

(57) ABSTRACT

Device for distributing oil from a rolling bearing (8) for an aircraft turbine engine, comprising: —a rolling bearing (8), —an oil distributor ring (5) and —an annular track (26) of a dynamic seal (22), characterised in that it further comprises a nut (16) screwed on to a thread (5d) of the distributor ring and bearing axially against an axial end of the inner ring
(Continued)

so as to clamp it axially, and in that the annular track is configured to bear axially against the distributor ring and comprises rotating locking elements (27) engaging with the additional elements (28) of the nut.

10 Claims, 4 Drawing Sheets

(51) Int. Cl.
*F01D 25/18* (2006.01)
*F02C 7/06* (2006.01)
*F16C 33/66* (2006.01)

(52) U.S. Cl.
CPC .... *F16C 33/6685* (2013.01); *F05D 2220/323* (2013.01); *F05D 2240/54* (2013.01); *F05D 2260/20* (2013.01); *F05D 2260/31* (2013.01); *F05D 2260/98* (2013.01)

(58) Field of Classification Search
CPC .... F05D 2260/31; F05D 2260/98; F02C 7/06; F16C 33/6637; F16C 33/6685
See application file for complete search history.

(56) References Cited

U.S. PATENT DOCUMENTS

| 10,047,649 | B2* | 8/2018 | Lucas | F16C 3/02 |
| 2015/0275760 | A1 | 10/2015 | Kimura | |
| 2016/0305283 | A1 | 10/2016 | Morreale et al. | |

FOREIGN PATENT DOCUMENTS

| FR | 3066549 A1 | 11/2018 |
| FR | 3073558 A1 | 5/2019 |
| WO | 2015/075355 A1 | 5/2015 |

* cited by examiner

[Fig.1]
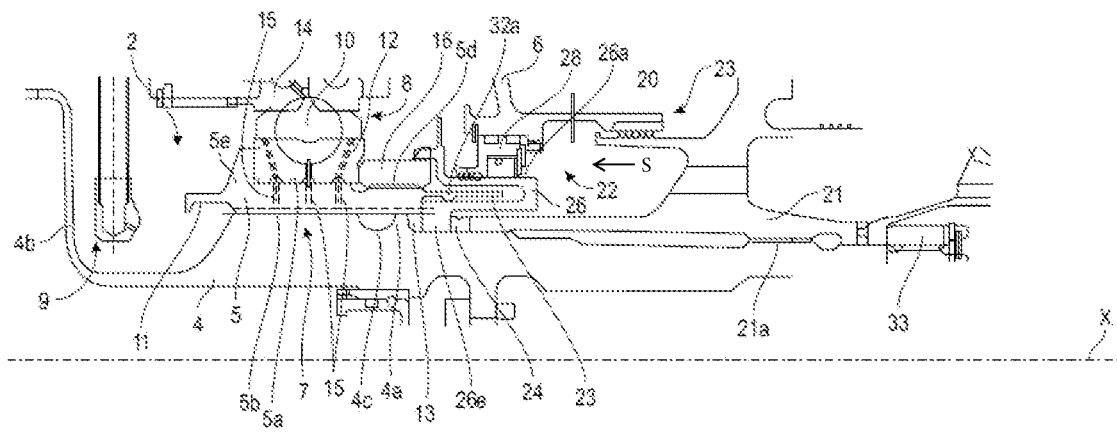
[Fig.2]
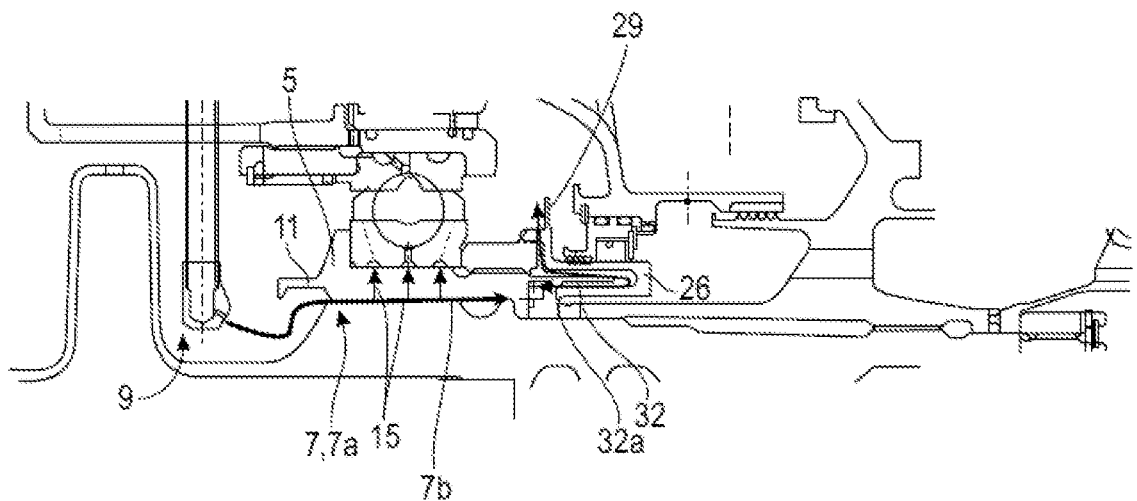

[Fig.3]
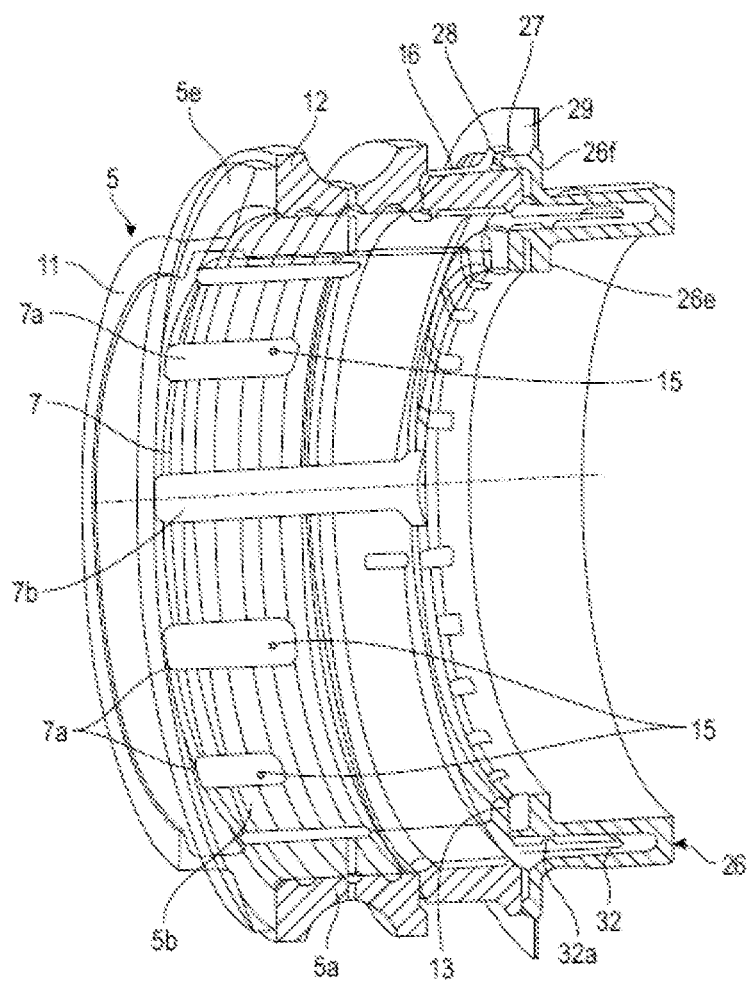

[Fig.4]
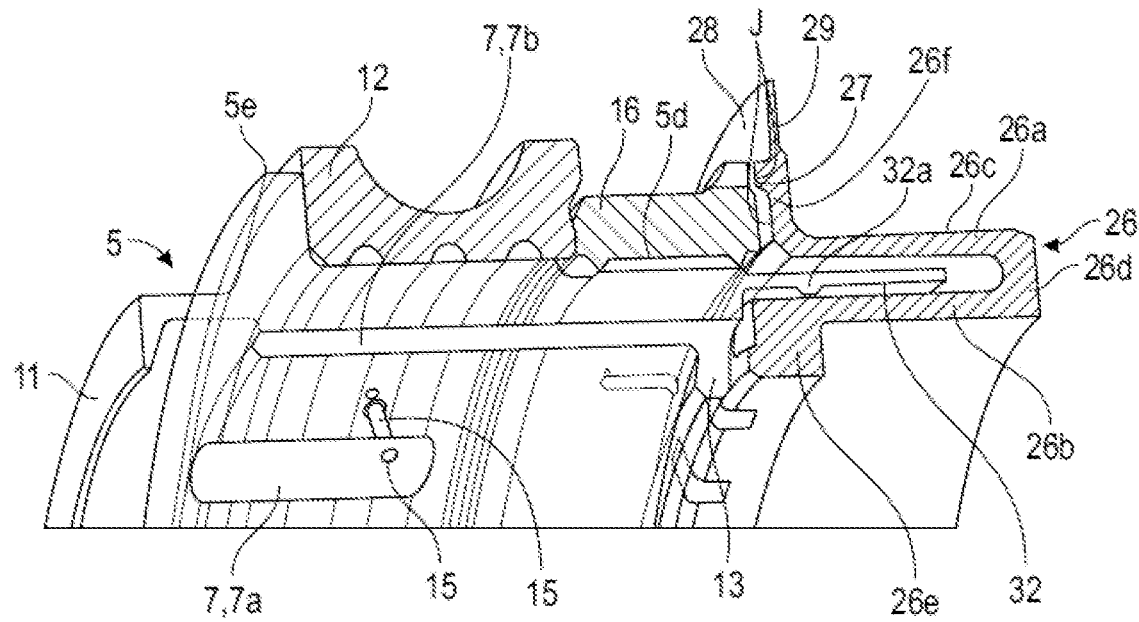
[Fig.5]
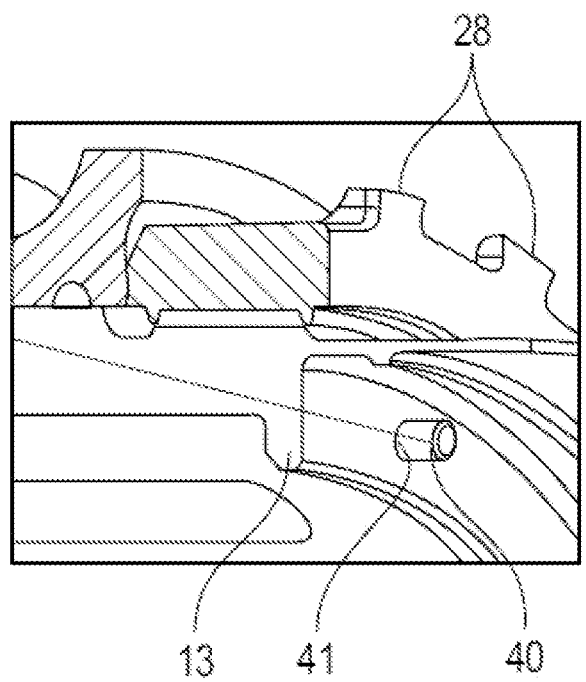

[Fig.6]
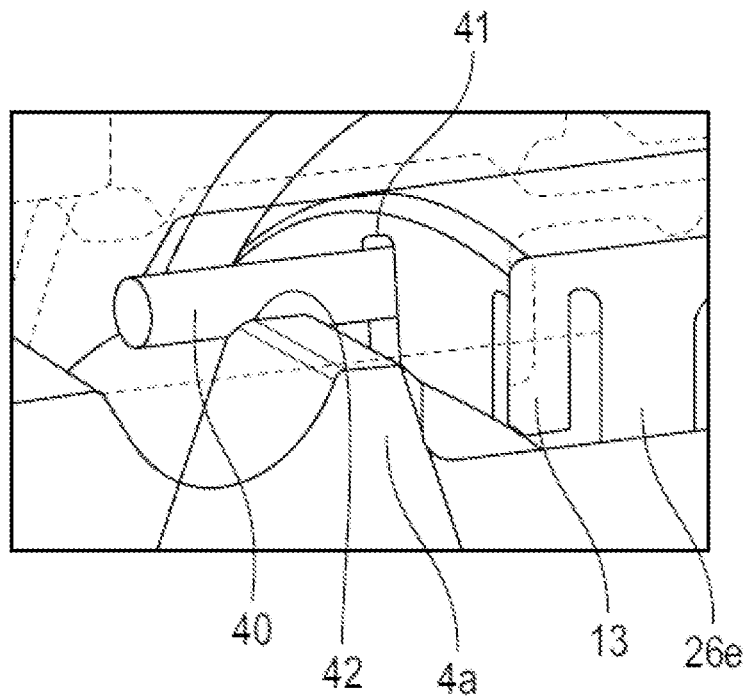
[Fig.7]
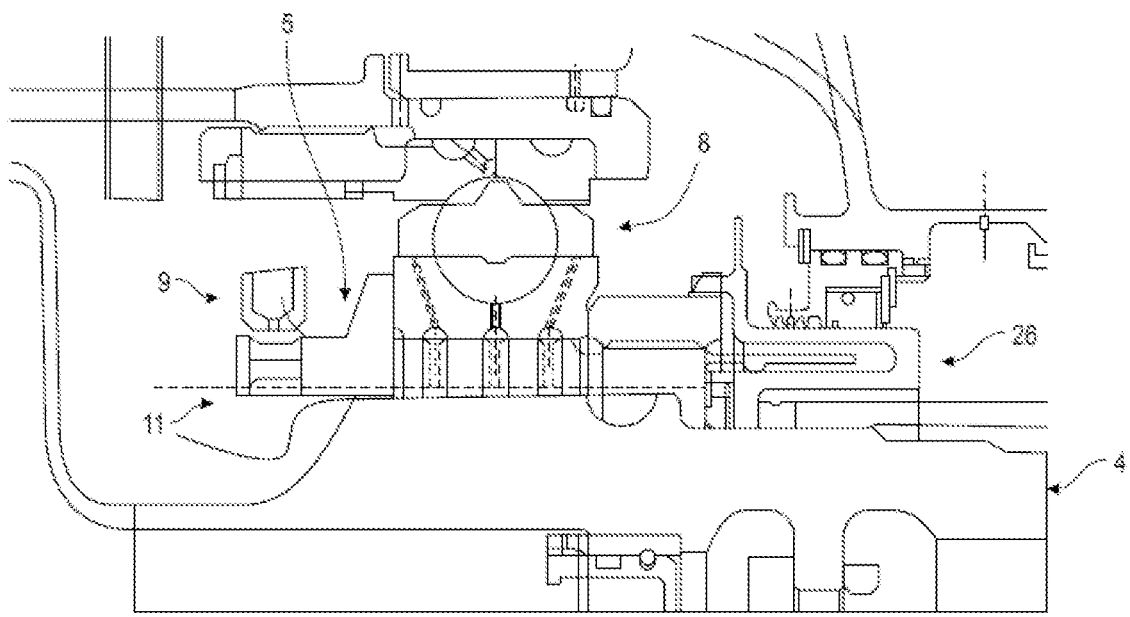

DEVICE FOR DISTRIBUTING OIL FROM A ROLLING BEARING FOR AN AIRCRAFT TURBINE ENGINE

TECHNICAL FIELD OF THE INVENTION

The present invention relates to a device for distributing oil from a rolling bearing for an aircraft turbine engine.

TECHNICAL BACKGROUND

The prior art comprises in particular the documents FR-A1-2 949 138, FR-A1-3 035 154, FR-A1-3 066 549, FR-A1-3 073 558, US-A1-2015/275760 and WO-A1-2015/075355.

In a known way, a turbine engine comprises a certain number of rolling bearings which are intended to support the rotor of the turbine engine in rotation, in particular with respect to a stationary support such as the casing of the latter.

During operation, the oil is typically injected on the rollings of these bearings so as to lubricate and cool them. To prevent the oil from spreading throughout the engine, it is necessary to confine the rolling bearings inside oil enclosures and to ensure a sealing of these oil enclosures from air enclosures adjacent to the engine, which must be free of oil.

More precisely, some oil enclosures are delimited between the shaft supported in rotation by the rolling bearing and an annular cover secured to a stationary support linked to the turbine engine casing and arranged around the shaft. A dynamic annular joint is typically positioned between the shaft and the cover to ensure a sealing between the oil enclosure and an adjacent air enclosure. Typically, the dynamic joint is mounted inside a flask that is attached to the cover.

The dynamic joints typically used in the rolling bearing oil enclosures for turbine engine are segmented radial joints (SRJ), comprising a plurality of annulus segments distributed circumferentially around a joint track rotating with the shaft of the rotor. These segments are in sliding contact with the joint track. The friction between the segments of the joint and the joint track generates heat that must be evacuated in order to maintain the mechanical integrity of these elements. One technique is to circulate cooling oil along the internal wall of the joint track.

The dynamic joint can be located right next to a rolling bearing that is lubricated by oil during operation. It is known to lubricate a rolling bearing by means of an oil distribution ring. The rolling bearing is mounted on the oil distribution ring, which comprises a scoop for recovering oil projected by a sprinkler, in order to collect this oil and supply a lubricating circuit for the bearing.

The present invention proposes an improvement to this technology which, in particular, allows to ensure the immobilisation, particularly in terms of rotation, of parts relative to one another in the restricted environment of an oil distribution device.

SUMMARY OF THE INVENTION

The invention relates to a device for distributing oil from a rolling bearing for an aircraft turbine engine, comprising:
- a rolling bearing comprising two rings, respectively internal and external,
- an oil distribution ring configured to be mounted on a turbine engine shaft, this distribution ring comprising:
  - i) an external cylindrical surface for mounting the internal ring of the bearing,
  - ii) an annular shoulder for supporting a first axial end of the internal ring, and
  - iii) an oil recovery scoop feeding a lubrication circuit of said bearing,
- an annular track of a dynamic joint, characterised in that it further comprises a nut screwed onto a thread of the distribution ring and being axially supported on a second axial end of the internal ring in order to tighten it axially against said shoulder, and in that said annular track is configured so as to be in axial support on said distribution ring and comprises rotation-locking elements cooperating with complementary elements of the nut.

The internal ring of the bearing is thus tightened and immobilized axially between the shoulder of the distribution ring and the nut screwed onto this distribution ring. To prevent an accidental loosening and unscrewing of the nut, it is locked in rotation by the track of the dynamic joint. This track is in axial support on the distribution ring and is therefore located in the immediate vicinity of this distribution ring. The function of locking in rotation the tightening nut of the ring is therefore assigned to an existing part, namely the track of the dynamic joint. This function is therefore ensured without the addition of any parts, which is advantageous from the point of view of cost, overall mass of the device and axial overall dimension.

The device according to the invention may comprise one or more of the following characteristics, taken alone or in combination with each other:
- the distribution ring comprises an internal cylindrical surface for shrink-fitting onto said shaft,
- said scoop and said shoulder are located at a longitudinal end of the distribution ring opposite said annular track,
- the distribution ring comprises an internal annular rim for axially locking this ring on said shaft,
- the annular track comprises an internal annular rim being supported axially on said annular rim of the ring,
- the rim of the joint track comprises or carries axial pins engaged in notches or orifices in the rim of the ring and configured to be engaged in notches or orifices of said shaft,
- the locking elements are formed by axial fingers which are regularly distributed around an axis of the device and are engaged into complementary recesses of the nut by dog clutch,
- the distribution ring comprises a cylindrical wall axially engaged in an annular space of said annular track and defining in this space an annular passage for the circulation of oil from said circuit towards oil projection orifices located at the external periphery of said track,
- said space is formed in an annular segment of U-shaped axial cross-section of said track, this annular segment comprising a cylindrical surface configured to cooperate with said dynamic joint.

The invention also relates to a turbine engine, in particular for an aircraft, comprising a shaft on which at least one device as described above is mounted, this shaft comprising a thread for screwing a nut for tightening said annular track and the distribution ring against a cylindrical shoulder of the shaft.

BRIEF DESCRIPTION OF THE FIGURES

Further characteristics and advantages will be apparent from the following description of a non-limiting embodiment of the invention with reference to the appended drawings in which:

FIG. 1 is a partial schematic half-view in axial cross-section of a turbine engine comprising an oil distribution device according to one embodiment of the invention, FIG. 2 is a view similar to FIG. 1 and shows the path of the oil in the device, FIG. 3 is a partial schematic view of the device of FIG. 1 in perspective and axial cross-section, FIG. 4 is a larger scale view of a portion of FIG. 3, FIG. 5 is a schematic perspective view of a detail of the device in FIG. 1, FIG. 6 is a schematic perspective view of a detail of the device in FIG. 1, and FIG. 7 is a view similar to FIG. 1 and shows an alternative embodiment of the device according to the invention.

DETAILED DESCRIPTION OF THE INVENTION

FIG. 1 shows a partial schematic of an oil enclosure 2 of an aircraft turbine engine bearing.

This oil enclosure 2 is delimited, on the inner side, by a shaft 4 rotating about an axis X, and on the outer side by an annular cover 6 which is secured to a stationary support linked to a casing (not shown) of the turbine engine and which is arranged around the shaft 4.

An oil distribution ring 5 is arranged around the shaft 4 coaxially to it, and is secured in rotation to it.

The oil enclosure 2 contains a bearing 8 comprising a plurality of rolling-elements 10 engaged between an internal ring 12 mounted on the distribution ring 5, preferably by shrink-fitting, and an external ring 14 secured to the casing of the turbine engine.

In the example shown in the figures, the rolling-elements 10 are balls. Nevertheless, the type of rolling or rolling-elements is not limiting in the scope of the present invention.

Oil is injected into the oil enclosure 2 to lubricate and cool the rolling-elements 10 of the bearing. For this purpose, oil is circulated in a lubrication circuit 7 accommodated between the distribution ring 5 and the shaft 4.

The oil is brought by an oil sprinkler 9, which is here located upstream of the distribution ring 5 (the terms "upstream" and "downstream" here refer to the general flow of the gases in the turbine engine). The ring 5 is generally annular in shape around the axis X and comprises at its upstream end a centrifugal type scoop 11 for recovering the oil projected by the sprinkler 9. This scoop is in the form of a cylindrical rim oriented upstream in the example shown. The scoop 11 extends around and away from the shaft 4 and defines with it an annular space for receiving oil from the sprinkler 9.

The oil circuit 7 comprises lunulas 7a, 7b formed on an internal cylindrical surface 5b for shrink-fitting the distribution ring 5 on the shaft 4. The lunulas 7a, 7b are of two types in the example shown in FIGS. 3 and 4.

The lunulas 7a of the first type extend over a portion of the longitudinal extent of the surface 5b and open at their upstream ends onto the upstream end of the ring 5, radially inside the scoop 11. Their downstream ends are connected to the radially internal ends of conduits 15 oriented substantially radially with respect to the axis X and opening at their radially external ends onto the surface 5a of the ring 5 on which the ring 12 of the bearing 8 is mounted.

The lunulas 7b of the second type extend over the entire longitudinal extent of the surface 5b and open at their upstream ends onto the upstream end of the ring 5, radially inside the scoop 11. Their downstream ends open onto the downstream end of the ring 5, radially inside an annular oil deflector 32 provided on the ring 5.

In the example shown, it can be seen that the sprinkler 9 is arranged downstream of a pin 4b formed in one part with the shaft 4, and upstream of the bearing 8.

To allow the ring 5 to be mounted by shrink-fitting onto the shaft 4 from the downstream side (this would not be possible from the upstream side due to the presence of the pin 4), the scoop 11 preferably has a minimum internal diameter greater than the minimum internal diameter of the surface 5b. The minimum diameter of the scoop 11 may be defined by an internal annular rim provided at the upstream free end of the latter.

The ring 5 thus comprises a deflector 32 which is in the form of a cylindrical wall centred on the axis X. In the example shown, this wall has a thin radial thickness and in particular is less than the minimum radial thickness of the rest of the ring 5, comprising the scoop 11. This deflector 32 may comprise on its internal cylindrical surface a projecting internal annular rib 32a.

At its downstream end, the ring 5 also comprises a radially internal annular rim 13 which is supported axially upstream against a cylindrical shoulder 4a of the shaft 4. An annular gorge 4c is located just upstream of this shoulder 4a and allows an optimum guiding of the force in the shaft 4 during the passage of torque between the shaft 4 and the distribution ring 5 shrink-fitted onto the shaft.

The internal ring 12 is in axial support upstream on an annular shoulder 5e of the ring 5. Downstream of the surface 5a for mounting the internal ring 12, the distribution ring 5 comprises an external thread 5d for screwing a nut 16 which is axially supported on the downstream end of the ring 12 in order to tighten it axially against the shoulder 5e.

The oil enclosure 2 further comprises a sealing system S intended to ensure a sealing of this oil enclosure relative from an adjacent air enclosure 20 which must be free of oil.

For this purpose, the sealing system S comprises in particular a dynamic annular joint 22. Typically, this dynamic annular joint 22 is composed of carbon annulus segments. The dynamic annular joint 22 is held in an annular flask 28 which is itself mounted inside the cover 6.

The flask 28 has a portion of L-shaped cross-section which receives the dynamic joint 22.

The dynamic annular joint 22 is associated with a joint track 26, which is rotatable and carried by the shaft 4. The track 26 comprises a contact surface 26a, in sliding contact with the dynamic annular joint 22. The contact surface 26a and the track 26 are treated to improve the joint/track sliding and minimize the wear of the dynamic annular joint 22.

The joint track 26 is generally annular about the axis X and is generally U or C shaped in axial cross-section defining an annular space oriented axially, here upstream, i.e. towards the distribution ring 5.

As can be seen in FIG. 4, the joint track 26 thus comprises two annular walls, respectively internal 26b and external 26c, which are coaxial and extend one inside the other. The wall 26c comprises the cylindrical support and sliding surface 26a of the dynamic joint 22.

The downstream ends of the walls 26b, 26c are connected by a median annular wall 26d oriented substantially radially with respect to the axis X. Each of the upstream ends of the walls 26b, 26c comprises an annular rim 26e, 26f also oriented radially.

The rim 26e extends radially inwards and opposite and downstream of the rim 13 of the distribution ring 5. It is intended to be tightened axially against this rim 13.

The rim 26f extends radially outwards and downstream of the nut 16. It has a double function in the example shown. On the one hand, it is equipped with an annular row of fingers 27 oriented axially upstream and engaged between dog teeth 28 or similar elements of the nut 16. This engagement ensures the locking in rotation of the nut 16 relative to the joint track 26 and thus relative to the ring 5 and the shaft 4.

The rim 26f is also provided with a radially outward annular extension 29 which forms a drop thrower, i.e., an element for guiding and projecting oil drops by centrifuging during operation.

The annular space defined by the joint track 26 receives the deflector 32 of the distribution ring 5, which is axially engaged from upstream in this space. In the mounting position shown in the drawings, the deflector 32 is spaced radially from the walls 26b, 26c by a predetermined and substantially constant distance. The deflector 32 is also axially spaced from the wall 26d.

The deflector 32 defines within this space an annular oil flow passage of U-shaped cross-section from the outlets or downstream ends of the lunulas 7b to an axial clearance J provided between the nut 16 and the joint track 26, at the level of the dog teeth 28 and the fingers 27 (FIG. 4). Due to the presence of this clearance J, the dog teeth 28 and the fingers 27 define radial oil passage orifices between them.

The sealing system S also comprises a labyrinth joint 23 arranged downstream of the dynamic annular joint 22, between a trunnion 21 mounted on the shaft 4 and the cover 6 (FIG. 1).

The trunnion 21 is rotationally secured to the shaft 4 by means of splines 21a. The trunnion 21 is located downstream of the distribution ring 5 and the joint track 26 and comprises an upstream end in axial support against the rim 26e of the joint track 26 or an annulus 24 interposed between this upstream end and the rim 26e (FIG. 1).

A nut 33 is screwed onto the shaft 4, downstream of the trunnion 21, and is intended to be supported axially upstream to axially tighten the rims 13 and 26e between the shoulder 4a and the trunnion 21. In addition, the ring 5 is preferably shrink-fitted onto the shaft 4 to ensure that it is centred as mentioned above.

As can be seen in FIGS. 5 and 6, the rim 26e of the joint track 26 carries axial pins 40 which are engaged in notches or orifices 41 in the rim 13 of the ring 5 and in notches 42 or orifices in the shoulder 4a of the shaft 4. This cooperation allows to immobilize in rotation the joint track 26 relative to the ring 5 and the shaft 4. It is thus understood that the nut 16, which is immobilized in rotation relative to the joint track 26, is also immobilized in rotation relative to the ring 5 and the shaft 4.

In the example shown, the pins 40 are fitted and attached by shrink-fitting into blind holes in the rim 26e of the joint track 26.

FIG. 2 shows schematically the oil flow path during operation by arrows. The oil is projected by the sprinkler 9 into the space delimited by the scoop 11 and enters the circuit 7. Oil is supplied to the bearing 8 through the conduits 15 for its lubrication and into the passage defined between the deflector 32 and the joint track 26. The oil flows through this passage to cool the joint track 26 by conduction, and is then evacuated through the aforementioned clearance J to be projected by centrifugation by the drop thrower formed by the extension 29.

The variant embodiment of the device shown in FIG. 7 differs from the previous embodiment essentially in that the centrifugal type scoop 11 is replaced by a centripetal type scoop 11'.

The device according to the invention allows, in particular, to ensure a locking in rotation of the nut 16 for axial immobilisation of the bearing 8, and this with an optimised axial and radial overall dimension. It also allows to ensure an optimum cooling of the joint track 26 in this restricted environment.

The invention claimed is:

1. A device for distributing oil in an aircraft turbine engine, comprising:
   a rolling bearing comprising an internal ring and an external ring,
   an oil distribution ring configured to be mounted on a turbine engine shaft, said oil distribution ring comprising:
      i) an external cylindrical surface for mounting the internal ring of the rolling bearing,
      ii) an annular shoulder for supporting a first axial end of the internal ring, and
      iii) an oil recovery scoop feeding a lubrication circuit of said rolling bearing,
   an annular track of a dynamic joint,
   wherein the device further comprises a nut screwed onto a thread of the oil distribution ring and being supported axially on a second axial end of the internal ring in order to tighten the internal ring axially against said annular shoulder, and in that said annular track is configured so as to be in axial support on said oil distribution ring and comprises rotation-locking elements cooperating with complementary elements of the nut.

2. The device according to claim 1, wherein the oil distribution ring comprises an internal cylindrical surface for shrink-fitting onto said turbine engine shaft.

3. The device according to claim 1, wherein said oil recovery scoop and said annular shoulder are located at a longitudinal end of the oil distribution ring opposite said annular track.

4. The device according to claim 1, wherein the oil distribution ring comprises a first internal annular rim for axially locking said oil distribution ring on said turbine engine shaft.

5. The device according to claim 4, wherein the annular track comprises a second internal annular rim supported axially on said first internal annular rim of the oil distribution ring.

6. The device according to claim 5, wherein the second internal annular rim of the annular track comprises or carries axial pins engaged in notches or orifices of the first internal annular rim of the oil distribution ring and configured to be engaged in notches or orifices of said turbine engine shaft.

7. The device according to claim 1, wherein the rotation-locking elements are formed by axial fingers which are regularly distributed around an axis of the device, and the complementary elements are formed by complementary recesses, said axial fingers being engaged by a dog clutch into said complementary recesses.

8. The device according to claim 1, wherein the oil distribution ring comprises a cylindrical wall axially engaged in an annular space of said annular track and defining in said annular space an annular passage for the circulation of oil from said lubrication circuit towards oil projection orifices located at the external periphery of said track.

9. The device according to claim 8, wherein said annular space is formed in an annular segment of a U-shaped axial cross-section of said track, said annular segment comprising a cylindrical surface configured to cooperate with said dynamic joint.

10. An aircraft turbine engine, comprising a turbine engine shaft on which is mounted at least one device according to claim 1, said turbine engine shaft comprising a thread for screwing said nut for tightening said annular track and the oil distribution ring against said annular shoulder of the turbine engine shaft.

* * * * *